June 30, 1953 R. A. MAHER ET AL 2,644,032

COLOR TELEVISION ROTATING FILTER DRIVE CIRCUIT

Filed Aug. 2, 1951

INVENTORS.

RICHARD A. MAHER.
DONALD S. OLIVER.
BY FRANK L. WEDIG Jr.

Alden D Redfield

ATTORNEY.

Patented June 30, 1953 2,644,032

UNITED STATES PATENT OFFICE 2,644,032

COLOR TELEVISION ROTATING FILTER DRIVE CIRCUIT

Richard A. Maher, Donald S. Oliver, and Frank L. Wedig, Jr., Cincinnati, Ohio, assignors to Avco Manufacturing Corporation, Cincinnati, Ohio, a corporation of Delaware Application August 2, 1951, Serial No. 239,886

4 Claims. (Cl. 178—5.4)

Figure 1:
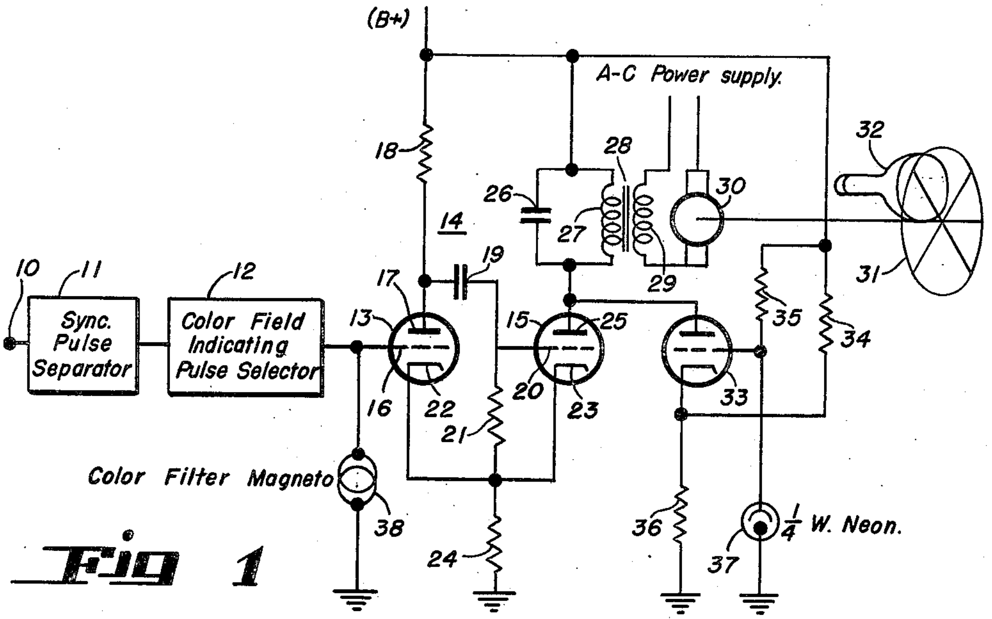

This invention relates in general to color television circuits and more specifically to color television receiver circuits using a rotating filter control and color phase-synchronization circuit and capable of receiving field sequential type of color signals. Color television signals of the field sequential type are produced at the transmitting camera by scanning an object successively with an odd field of one color, an even field of a second color, an odd field of a third color, an even field of the first color, etc. until an even and an odd field for each color has been scanned to make up a complete color frame. For synchronizing the position of the color filter segments with relation to these color fields the color television signal adopted by the Federal Communications Commission includes a color-field-indicating pulse which comprises a pulse having the general shape of an equalizing pulse and which is inserted in the equalizing pulse train just prior to the red field vertical synchronizing pulse midway between the first and second equalizing pulses. A color pulse selector circuit for extracting this standardized color-field-indicating pulse from the composite video signal is described in United States patent application Serial No. 216,142 by R. A. Maher and C. C. Pfitzer.

A successful field sequential type color television receiver must not only be able to select this low energy color-field-indicating pulse out of the composite color video signal but it must also be able to utilize it to synchronize and correct the phase position of the color filter which is rotated in front of the viewing kinescope. Unfortunately, the majority of prior art circuits ignore the presence of the color-field-indicating pulse, using a manual type of synchronization which is controlled by a push button shorting device designed to either slow down or speed up the color filter drive motor. This type of control may be satisfactory for the laboratory and general field testing necessary to prove the overall-feasibility of the sequential type color TV system, but it leaves much to be desired from the viewpoint of a non-technical consumer who desires to buy a television receiver which operates without constant attention. In other words, it would be desirable to supply a color television receiver which automatically brings the proper filter into place before the kinescope screen at the proper time.

With these factors in mind, therefore, it becomes an object of our invention to provide an efficient and practical color-field-indicating pulse synchronized color filter control circuit which automatically places the color filter in front of the receiver kinescope at the proper instant whenever the color pulse is present and regardless of intermittent total elimination of the color-field-indicating pulse during program interruptions.

It is also a basic object of this invention to provide a synchronized color filter control circuit which automatically and rapidly responds to shifts in the color-field-indicating pulse train brought about by camera changes and interruptions or changes in the sync pulse sequence arising from insertion of local transmission into a signal produced in a distant studio and transmitted by coaxial cable or microwave link.

It is a further object of this invention to provide an automatically synchronizable color filter control circuit which is independent of reasonable supply voltage fluctuations.

It is a still further object of this invention to provide an automatically synchronizable color filter control circuit which allows the color filter rapidly to assume near synchronous speed without the necessity of push button manipulation or other manual circuit adjustment by the operator.

Figure 2:
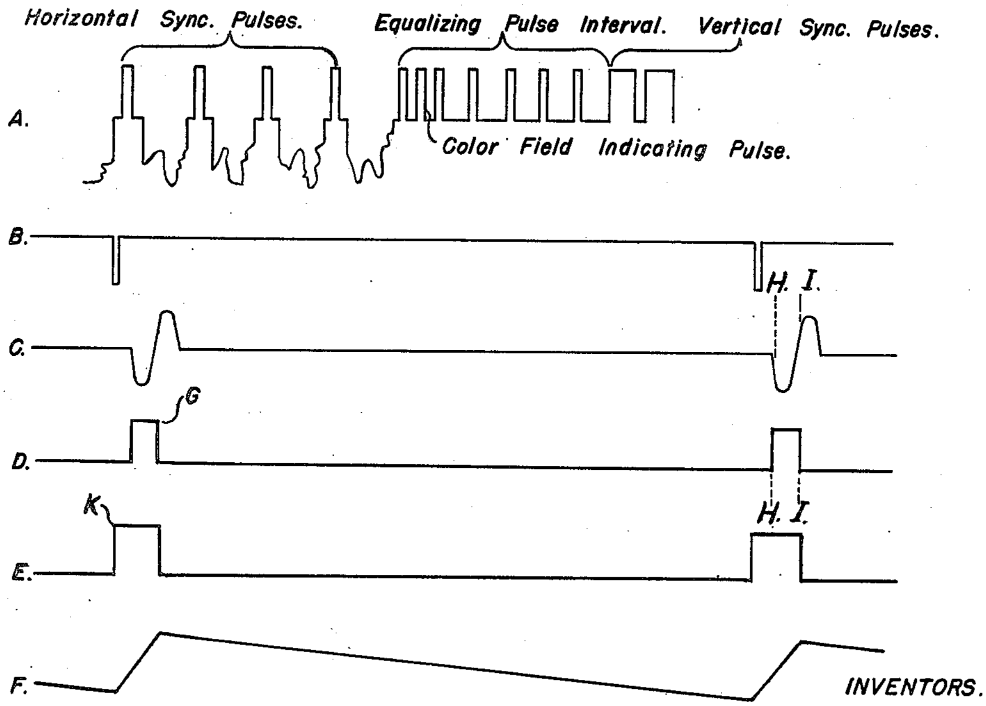

For a better understanding of our invention, together with other and further objects, advantages and capabilities thereof reference is made to the following description and appended claims in connection with the accompanying drawings, in which:

Fig. 1 is a schematic diagram of a specific embodiment of our color filter drive circuit, and Fig. 2 is a set of curves used to explain operation of the circuit of Fig. 1.

Briefly, in practicing our invention we provide a rotating color filter which is driven by an alternating current motor at a speed approximately synchronous with the pulse repetition frequency of the color-field-indicating pulses present in the color television composite video signal. The rotating color filter may take the form, e. g., of either a disc or a drum having a plurality of color filter segments. However, the type of rotating color filter used forms no part of this invention and for this reason will not be specifically considered in the following discussion. The alternating current drive motor, per se, is selected to rotate the color filter at a speed which is slightly above the desired synchronous speed and a current controlled braking device is used to slow down the color filter so as to automatically bring it into synchronism and correct phase position with relation to the pulse repetition frequency and phase position of the color-field-indicating pulses. The current controlled braking device may take the form of either a saturable core reactor in series with the alternating current drive motor or it may take the form of an eddy current brake attached to the drive shaft of the alternating current motor. It should be noted however that there is a fundamental operational difference between the eddy current brake system and the saturable core reactor system, the latter being used in the preferred embodiment disclosed. That is, in the eddy current type of braking device the braking effect is almost directly proportional to the period of energization while in the saturable core reactor type, as will become clear, the braking effect is approximately inversely proportional to the period of energization of the reactor primary.

Regardless of the type of device utilized to oppose the action of the alternating current drive motor, we energize this device through a control circuit comprising a unistable multivibrator triggered by pulses taken from two pulse sources. One of these pulse sources can be a circuit similar to that described in United States Patent application Serial No. 216,142 by Maher and Pfitzer for extracting the color-field-indicating pulse from the composite signal color to supply what can be defined as the "order" pulse, or the pulse with which the unit is to be synchronized. The second pulse, which can be defined as the "reference" pulse, is taken from a device, attached to the rotating color filter or filter shaft, which is capable of generating a pulse each time a given color segment is positioned in front of the kinescope. It may take the form of a pulse generating magneto or a photoelectric cell operated pulse generating circuit if such is desired. Other equivalent circuits and means will occur to those skilled in the art, the specific type of pulse generating means forming no part of the present invention.

These two pulse trains, i. e., the color-field-indicating pulse from the composite video signal and the reference pulse fed from a pulse generator attached to the rotating color filter, are fed to the input of the unstable multivibrator with such polarity as to periodically trigger the multivibrator from its stable position into its unstable position. The means used to control the speed of the alternating current drive motor, within limits, is energized for a period which is proportional to the time the multivibrator is in one of its two conducting positions, and thus the filter disc rotational speed and filter segment phase position is intermittently braked and controlled to a degree directly dependent upon the phase relationship between the two input pulses.

As a result, in the specific embodiment disclosed, where the braking means comprises a saturable core reactor, if the rotating color filter is moving too slowly or phase lagging, the multivibrator is allowed to remain in its stable position for a period of time slightly longer than it does at synchronism thereby reducing the braking effect supplied by the braking device or in this case the reactor, with a resulting increase in speed or phase advance of the color filter segments. Then if for some reason, the rotating color filter starts running above synchronous speed or phase advanced, the multivibrator is forced to remain in its unstable position slightly longer than it would if the color filter were synchronized thereby increasing the braking effect supplied by the braking device with a resultant decrease of speed or retrogressive phase shift of the filter segments. We have found that this circuit brings the color filter disc rapidly into synchronism with the color-field-indicating pulses, and rigidly maintains the correct filter segment before the kinescope screen regardless of slight interruptions in the color-field-indicating pulse train.

In order to explain the details of a typical circuit which embodies our invention, we have shown in Fig. 1A only the portions of a conventional television receiver circuit which are necessary to a full understanding of our invention. For example, the input to terminal 10, of Fig. 1 may be taken from any source of composite television signals conventionally used to feed a sync pulse separator such as unit 11. Usually the sync pulse separator is fed from the output of a video amplifier, often in conjunction with a D.-C. level stabilization circuit, where one is used. The separated sync pulses taken from the output of unit 11 are fed to a color-field-indicating pulse selector circuit 12 which may be of the type described in the previously mentioned Maher et al. application Serial No. 216,142, but not at all limited thereto. The output of the color-field-indicating pulse selector 12 is coupled to tube 13 which comprises the input tube of multivibrator circuit 14, the second tube of which is indicated by numeral 15. The plate or anode 17 of input tube 13 is connected through a plate resistor 18 to a source of B+, not shown. Anode 17 is also coupled through capacitor 19 to grid 20 of multivibrator output tube 15 and grid 20 in turn is connected through grid resistor 21 to cathode 22 of tube 13 and cathode 23 of tube 15. The common junction between resistor 21 and cathodes 22 and 23 is connected through cathode resistor 24 to ground. Anode 25 of multivibrator output tube 15 is connected through a charge storage capacitor 26 to the source of B+, not shown. The primary 27 of a saturable core reactor 28 is connected in parallel with the charge storage capacitor 26, while the secondary 29 of the saturable core reactor is connected in series with the A.-C. line through color filter drive motor 30 which in turn is mechanically connected to rotate a color filter 31 positioned in front of the screen of kinescope 32. Tube 33 comprises a regulating tube for maintaining current flow through the saturable core reactor 28 constant regardless of slight fluctuations in the amplitude of the power supply voltage. As will hereinafter be explained resistors 34 and 35, connected to the cathode and grid circuits of tube 33 respectively operate in conjunction with cathode resistor 36 and voltage stabilization tube 37 to maintain the correct current flow through the saturable core reactor 28 regardless of reasonable power supply fluctuations. Color filter magneto 38 which is shown diagrammatically connected to grid 16 of input tube 13 is actually mechanically associated with color filter 31 and may take the form of a pulse generator capable of producing a pulse each time a selected color filter segment arrives at a selected position relative to the kinescope screen. The specific type of pulse generator is immaterial as far as the invention described and claimed herein is concerned; however, in the specific embodiment built and tested it was found convenient to use a small piece of magnetic material fixedly attached to one of the color filter segments in conjunction with a magnetic field structure having an air gap through which the magnetic material on the color filter could pass, thereby changing the reluctance of the flux path to produce a pulse in a coil magnetically coupled to the yoke of the magnetic field structure. Other pulse generators, such as those dependent upon a make and break contact or upon the interruption of a light beam illuminating a photoelectric cell, might be used. Still other circuits for this purpose will readily occur to those skilled in the art, however, since the specific type of pulse generator forms no part of the present invention, the diagrammatic showing of pulse generator or magneto 38 is considered to be sufficient.

Considering now the manner in which the above described circuit operates, reference is made to the circuit of Fig. 1, in conjunction with the curves of Fig. 2B through Fig. 2F. Before considering actual circuit operation, perhaps it would be best to consider the signal wave form of Fig. 2A, wherein there is shown a few horizontal sync periods just prior to and including the color-field-indicating pulse period. According to the FCC standards, the color-field-indicating pulse is included in the equalizing pulse interval prior to each red field. Since the standard signal contemplates that three primary colors be used with an odd field and an even field assigned to each color, it becomes clear that there will be two color-field-indicating pulses for each complete color frame. As presently contemplated, there are 24 color frames per second and thus 48 color-field-indicating pulses per second. However, it is to be realized that the invention herein described is not limited to any specific field, frame or line interval.

As shown in the curve of Fig. 2A, the color-field-indicating pulse has the same duration and amplitude as one of the qualizing pulses. Also, it can be seen the color-field-indicating pulse is positioned between the first and second equalizing pulse immediately preceding the given color field vertical sync pulse, which as standardized, is the red vertical sync pulse. Proceeding with the detailed explanation of circuit operation, keeping in mind the general shape of the wave transmitted in a field sequential type color television signal, it is to be noted that the negative pulses of Fig. 2B are similar to the color-field-indicating pulse of Fig. 2A, except that the polarity is reversed. This signal is derived from a source of composite color video signals fed into terminal 10 of Fig. 1 and though the amplitude and fidelity of the composite video signal fed into sync pulse separator 11 is material to the satisfactory operation of this separator unit, it is otherwise immaterial, as far as this invention is concerned. The complete set of sync pulses are taken from the output of separator 11 and fed into the color-field-indicating pulse selector 12 where the color-field-indicating pulse is selected for use, to the exclusion of all the other synchronizing pulses, viz., the equalizing pulses and the horizontal and vertical sync pulses. If the color-field-indicating pulse selector, per se, separates out the color-field-indicating pulse in a positive going sense, then it will be necessary for proper operation of the specific embodiment of the invention shown to invert the pulse to be in accordance with the pulse curve of Fig. 2B before feeding it to the grid 16 input of multivibrator 14. As will be brought out more clearly hereinafter, the polarity of the input pulse may be reversed if so dictated by circuit designs with which the invention is to be utilized. However, care must be taken in arranging the various circuit components before such a polarity reversal can be accomplished and it has been found, in at least the specific embodiment disclosed, preferable to apply this pulse in a negative sense to the input of the unistable multivibrator 14.

An exhaustive consideration of basic unistable multivibrator action is not deemed necessary, however, briefly considering circuit operation, it should be understood that this type of circuit has two conducting positions. When one of the tubes is conducting the other tube is cut off and symmetrically, when the second tube is conducting the first tube is cut off. This can be more fully appreciated by referring to the multivibrator circuit 14. In the absence of an input signal, immediately after the circuit is energized current will flow through either or both of tubes 13 and 15. Regardless of which tube is conducting, the current must flow through cathode resistor 24. As will be noted from the circuit diagram, the drop across cathode resistor 24 acts to bias the grid of tube 13 negatively toward cut off while the drop across this resistor has little if any action on the grid cathode potential relationship of tube 15. As a result if tube 13 was originally conducting the drop across cathode resistor 24 starts to drive tube 13 to cut off, raising the potential on anode 17 as well as on grid 20 which is coupled to anode 17 through capacitor 19. The rise in grid cathode potential of tube 15 forces more and more current to flow through this tube and cathode resistor 24 thus supplying a still greater negative bias between grid 16 and cathode 22 of tube 13. It is apparent, then, that the circuit will stabilize out with tube 15 conducting and tube 13 cut off.

Now assume that a positive input signal is fed to grid 16 of tube 13. If the positive signal is sufficient to raise the potential of grid 16 above cut off then current will flow through plate resistor 18 and cathode 22. The resultant drop of anode potential of tube 13 is reflected through coupling capacitor 19 to grid 20 of tube 15, lowering the potential of this grid with relation to its cathode 23. In other words, as conduction increases in tube 13, capacitor 19, which was previously charged with its anode 17 terminal positive relative to its grid 20 terminal, discharges through the anode cathode path of tube 13 and resistor 21 to drive grid 20 negative with respect to cathode 23, thus cutting off or tending to cut off tube 15. As the current flow through tube 15 is decreased less current flows through cathode resistor 24 thus decreasing the negative bias between grid 16 and cathode 22 of tube 13 with a resulting increase in current flow in tube 13 and an increased capacitor discharge current through resistor 21. If the positive input pulse is of high enough amplitude to start this action tube 13 will be driven into full conduction and tube 15 will be completely cut off. After the positive input pulse has decayed or is taken away from tube 13, capacitor 19 will continue to discharge through a circuit including grid resistor 21 until a stable potential point is reached. As the capacitor 19 discharge current starts to decrease, the negative bias on grid 20, supplied by the drop across resistor 21, starts to decrease and in the absence of another positive input pulse a point will be reached where tube 15 will again start to conduct, rapidly cutting off electron flow in tube 13.

Referring now to the manner in which the multivibrator action is utilized, it can be seen that the current flow through output tube 15 performs two functions, viz., it places a charge on capacitor 26 and it causes the core of saturable core reactor 28 to become saturated thus lowering the impedance of coil 29 so as to impress essentially full line voltage on color filter drive motor 30. Color filter drive motor 30, as a result rapidly assumes a speed which is greater than desired synchronous speed and in the absence of control pulses on the input of control tube 13 this condition maintains. However, as has been explained color filter magneto 38 supplies a pulse to the input grid 16 of tube 13 each time a given color filter segment reaches a selected position relative to the kinescope screen. The selection of the correct color filter segment is preferably controlled by the relative signal position of the color-field-indicating pulse. Therefore, since the color-field-indicating pulse has been assigned to each red field by the FCC, the color filter magneto is preferably positioned to produce a pulse each time the red color filter starts to cross the face of the kinescope screen.

In the particular embodiment disclosed in Fig. 1, the color filter magneto produces a pulse having approximately a sine wave shape similar to that shown in the curve of Fig. 2C and as can be seen from this curve, the negative going portion of the pulse wave leads the positive going portion. Since both portions of the pulse wave are impressed on the input grid 16 of tube 13, even in the absence of any other input pulse the positive portion of the wave triggers tube 13 into conduction and as a result tube 15 is driven to cut off. Multivibrator 14 then remains in this position until either the negative portion of an input pulse is impressed on the circuit or capacitor 19 discharges sufficiently to allow conduction in tube 15, or in the absence of another input pulse, until the next magneto negative pulse wave cuts off tube 13 to drive output tube 15 into conduction. This last factor is important because in actual practice the negative going portion of wave shape Fig. 2C acts as a limit on the control action possible in the disclosed circuit. This can be seen by comparing the curve of Fig. 2C with the curve of Fig. 2D. The positive portion of the wave shape Fig. 2C, i. e., the positive portion of the magneto feed-back or reference pulse, triggers tube 13 into conduction and cuts off tube 15. This point in time is shown at G on the curve of Fig. 2D which is actually an idealized representation of the current wave form flowing through output tube 15. Then, when the negative going portion of the wave Fig. 2C at H hits the input of tube 13, tube 15 is again triggered into conduction to be cut off by the positive peak I of the magneto pulse. In other words, in the absence of any other pulse and in the presence of a magneto or feed-back reference pulse, having a negative portion and a positive portion such as shown in the curve of Fig. 2C, the output tube 15, of necessity conducts for a period substantially equal to the time period between the negative and the positive peak.

The plate load impedance of tube 15 or coil 29 has its greatest impedance to A.-C. drive motor current when the electron flow is cut off in tube 15 and no current is flowing in the primary coil 27. Referring back to the curve of Fig. 2D, it can be seen that no plate current is flowing through tube 15 for the period GH. This means, assuming the shape of the reference or feed-back pulse of Fig. 2C is fixed, that the period HI illustrates the minimum plate current which can flow in tube 15 and thus represents the minimum speed at which A.-C. drive motor 30 can be forced to operate under control. Now it becomes apparent that the parameters of the circuit so far disclosed must be set so that this speed is slightly less than the desired synchronous speed allowing a suitable speed gap between this speed and the maximum unimpeded speed of the drive motor so that an order pulse from unit 12, which increases the conduction period of tube 15 can speed up A.-C. drive motor 30 or at least advance the phase position of its rotor shaft.

The action of the order pulse which is fed from color-field-indicating pulse source should now be clear. Obviously, the order pulse must be negative going in character, having sufficient amplitude to cut off tube 13 and trigger 15 into conduction. The color-field-indicating pulse extracted from the composite sync signal by unit 12 has these characteristics as shown by the curves of Fig. 2B. Therefore, if it is assumed that the unit has just warmed up and balanced itself out, so that tube 15 conducts in accordance with the curves of Fig. 2D, it can be seen that, when the pulses from unit 12 are fed to the input of tube 13, tube 15 will conduct in accordance with the curve of Fig. 2E, with the leading edge of the current pulse in tube 15 starting in phase coincidence with the first negative going pulse of Fig. 2B, fed from the output of unit 12. The negative going portion of the feed-back or reference pulse shown in Fig. 2C will have no effect on the circuit, other than establishing a limiting condition, as has been brought out, beyond which changes in the phase relationship between the curves of Fig. 2B and the curves of Fig. 2C can not be depended upon to make the circuit function properly.

It now will be apparent that any phase position drift of the feed-back pulse out of its synchronous position will cause a counteracting force to be applied to the drive motor 30. If the pulses shown in Fig. 2C start to lag the pulses of Fig. 2B the conduction time of tube 15 will automatically increase, lengthening the periods of the load current pulses shown in Fig. 2E, thereby increasing the saturation period of reactor 28 and the speed of drive motor 30. Conversely, if the filter is driven too rapidly, thereby narrowing the phase gap between the pulses of Fig. 2B and the pulse of Fig. 2C, tube 15 will conduct for a time shorter than normal, thus lessening the duration of the load current pulses shown in Fig. 2E with a resultant decrease in the period of saturation of reactor 28, which in turn decreases the speed of drive motor 30, to bring about a corrective movement of the color filter in front of kinescope 32. The action of capacitor 26 will now be explained.

Because of the relatively large amount of current required to control a practical saturable core reactor it was found necessary to consider some means of carrying this heavy load without using tubes of exceptionally high current rating or other expensive units. This was accomplished by placing a storage capacitor 26 in parallel with primary 27 of saturable reactor 28 and using an intermittent high current plate pulse. Thus it is possible to place a charge on capacitor 26 which can be used to supply current through primary 27 while tube 15 is cut off and dissipating accumulated heat. For this reason the curves of Fig. 2F more accurately indicate the saturable core reactor current slow decay period. However, even though condenser 26 is large enough to discharge into primary 27 for substantially the whole period that tube 15 is cut off, the basic control action remains the same as was explained above. For example, if the conduction period of tube 15 is increased, the charge on capacitor 26 in increased resulting in increased saturation of the core in reactor 28. Conversely, if the period of conduction of tube 15 is decreased, the charge on capacitor 26 is decreased resulting in a decreased current flow through the reactor primary 27.

The circuit thus far explained basically comprises a complete filter drive motor control. However, it was found that fluctuations in the plate voltage cause errors in the phase relationship between the color filter segments and the color-field-indicating pulse. In order to overcome this plate voltage sensitivity of the control circuit, tube 33 and its accompanying circuitry were supplied for stabilization. Basically, this circuit comprises a constant voltage tube 37 which acts as a reference potential for the grid of tube 33 keeping it at a fairly constant potential above ground. The potential at the cathode of tube 33 is supplied by the voltage divider action of resistors 34 and 36, thereby allowing the cathode potential to fluctuate with changes in B+ supply voltage. When the B+ supply voltage decreases the potential at the cathode obviously decreases, thereby increasing the grid-cathode potential of tube 33, thus increasing plate current flow through this tube. As can be seen, the plate current of tube 33 is also drawn through the plate circuit of tube 15 and any variation in the current flow through tube 33 is also felt in the plate supply of the multivibrator output tube. In other words, if the B+ potential supply voltage drops there is an increase of current flow through tube 33 and a resulting increase of current flow through primary coil 27 and charge capacitor 26. If the potential of the B+ supply increases, the voltage divider action of resistors 34 and 36 increases the cathode potential of tube 32, relative to ground thereby increasing the grid cathode potential. This reduces the current flow through tube 33 and also the current flow through coil 27 and charge capacitor 26. Even though the current flow through tube 33 is continuous, its compensating action is sufficient to take care of variations in the saturating current fed through primary 27 brought about by changes in B+ supply potential.

Now that circuit operation has been exhaustively considered it will be apparent to those skilled in the art that various polarity modifications can be made to the circuit. For example, if the color-field-indicating pulse selector circuit operates to produce a positive going pulse it might be desirable to change the polarity of the reference pulse fed back from the color filter. This would mean that if the reference pulse has a sine wave such as that shown in Fig. 2C the polarity should be changed so that the positive going portion leads the negative going portion. On the other hand, if the feed-back pulse is shaped to be unidirectional in character then a negative going pulse alone should be selected. These two pulses of opposite polarity then should be fed to the grid of output tube 15 in lieu of the grid of input tube 13 as shown in Fig. 1. Thus the positive going order pulse or color-field-indicating pulse will still trip tube 15 into conduction and the negative going portion of the reference or feed-back pulse from the color wheel will still cut off current flow in tube 15. Also, it can be seen if a sine wave type of reference pulse is used, in the absence of a pulse from unit 12, that the positive going portion of the feed-back pulse will cut off current flow in tube 15 much in the same manner as was explained with respect to the preferred embodiment disclosed in Fig. 1.

Thus it will be seen from the complete description of our novel circuit that we have provided a circuit combination comprising a source of color-field-indicating pulses 12, a rotatable color filter 31 having at least one color filter segment of appropriate hue for each video signal color-separation value, electrical driving means 30 associated with said color filter 31 for rotating said color filter in front of the receiver kinescope 32 screen at a speed slightly greater than the speed necessary for synchronization between the color-field-indicating pulses and the appropriate color filter segment, electrical energizable braking means 28 associated with the drive means and filter for providing a controllable braking effect, a source of color filter pulses, one color filter being produced each time a color filter segment assigned to said selected color-separation video signal passes a fixed position relative to the kinescope screen, means 14 for energizing said braking means comprising a unistable multivibrator 14 having its input 16 coupled to said sources of color-field-indicating pulses 12 and color filter pulses 38, an impedance 26 connected in the output of said multivibrator, said impedance having two terminals coupled to supply said electrical braking means.

While we do not desire to be limited to any specific circuit parameters such parameters varying in accordance with individual designs, the following circuit values have been found entirely satisfactory in the illustrated embodiment of the invention:

*Tubes*

| | |
|---|---|
| 13 and 33 | 12AT7 |
| 15 | 6V6 |

*Resistors*

| | | |
|---|---|---|
| 18 | ohms | 100,000 |
| 21 | megohms | 10 |
| 24 | ohms | 390 |
| 34 | do | 6800 |
| 35 | do | 100,000 |
| 36 | do | 3900 |

*Capacitors*

| | Microfarad |
|---|---|
| 19 | .01 |
| 26 | 1 |

While there has been shown and described what at present is considered the preferred embodiment of the present invention, it will become obvious to those skilled in the art that various changes and modifications may be made therein without departing from the invention as defined by the appended claims.

Having thus described our invention, we claim:

1. In a color television receiver for receiving a signal having successive video portions representing different color-separation values of the image to be reproduced, each video portion of at least one color-separation value also including a color-field-indicating pulse, the combination comprising a source of color-field-indicating pulses, a rotating color filter having at least one segment aassigned to the color-separation value represented by said color-field-indicating pulses, means for producing a color-filter pulse whenever said one color filter segment assumes a given angular position, a non-synchronous motor for rotating said color filter, means for controlling said filter rotating motor comprising a multivibrator having a grid controlled input tube and a grid controlled output tube, means coupling said source of color-field-indicating pulses to the input tube of said multivibrator with such polarity that each color-field-indicating pulse drives the multivibrator output tube into conduction and means for coupling said source of color-filter pulses to said multivibrator input tube with such polarity that each color-filter pulse drives said multivibrator output tube into non-conduction, a source of alternating current, a saturable core reactor having a control winding and a controlled winding, means coupling the control winding of said saturable core reactor ito the output of said multivibrator and means coupling the controlled winding of said saturable core reactor between said source of alternating current and said filter rotating motor.

2. In a color television receiver for receiving field sequential type color video signals including color-field-indicating pulses the combination comprising a source of color-field-indicating pulses, a rotatable color filter having at least one segment assigned to each different video signal color field transmitted in a color frame, a source of color filter pulses, a color filter pulse being produced each time the color filter is correctly positioned relative to a fixed viewing screen for reception of the color field identified by a color-field-indicating pulse, means for rotating said color filter at a speed which is slightly greater than that necessary to maintain synchronism between the color filter segments and the color-field-indicating pulses, electrically controllable braking means for retarding the rotational speed of said filter, control means for said braking means comprising a unistable multivibrator having a grid controlled input tube and a grid controlled output tube, said output tube conducting when said multivibrator is in its stable position, means coupling said pulse sources to said multivibrator with such polarity that the color-field-indicating pulses drive the multivibrator output tube into its conducting position and said color filter pulses drive said multivibrator output tube into its non-conducting position, impedance means for coupling said multivibrator output tube to said braking means.

3. In a color television receiver for receiving field sequential type color video signals including color-field-indicating pulses the combination comprising a source of color-field-indicating pulses, a rotatable color filter having at least one segment assigned to each different video signal color field transmitted in a color frame, a source of color filter pulses, each color filter pulse indicating the instantaneous position of said color filter relative to a fixed viewing screen, means for rotating said color filter at a speed which is slightly greater than that necessary to maintain synchronism between the color filter segments and the color-field-indicating pulses, electrically energizable braking means for retarding the rotational speed of said filter when de-energized, control means for said braking means comprising a unistable multivibrator having a grid controlled input tube and a grid controlled output tube, said output tube conducting when said multivibrator is in its stable position, means coupling said pulse sources to said multivibrator with such polarity that the color-field-indicating pulses drive the multivibrator output tube into its conducting position and said color filter pulses drive said multivibrator output tube into its non-conducting position, impedance means for coupling said multivibrator output tube to said braking means.

4. In a color television receiver for receiving field sequential type color video signals including color-field-indicating pulses the combination comprising a source of color-field-indicating pulses, a rotatable color filter having at least one segment assigned to each different video signal color field transmitted in a color frame, a source of color filter pulses, each color filter pulse indicating the instantaneous position of said color filter relative to a fixed viewing screen, means for rotating said color filter at a speed which is slightly greater than that necessary to maintain synchronism between the color filter segments and the color-field-indicating pulses, electrically energizable braking means for retarding the rotational speed of said filter when de-energized, control means for said braking means comprising a unistable multivibrator having a grid controlled input tube and a grid controlled output tube, a power source for said multivibrator, said output tube conducting when said multivibrator is in its stable position, means coupling said pulse sources to said multivibrator with such polarity that the color-field-indicating pulses drive the multivibrator output tube into its conducting position and said color filter pulses drive said multivibrator output tube into its non-conducting position, impedance means for coupling said multivibrator output tube to said braking means and current regulating means coupled to the output of the multivibrator circuit for stabilizing the current flow in said impedance means so as to substantially eliminate color filter segment phase shift rising out of fluctuations in the multivibrator supply voltage.

RICHARD A. MAHER.
DONALD S. OLIVER.
FRANK L. WEDIG, JR.

References Cited in the file of this patent

UNITED STATES PATENTS

| Number | Name | Date |
|---|---|---|
| 2,502,195 | Wood | Mar. 28, 1950 |
| 2,509,729 | Dome | May 30, 1950 |
| 2,509,730 | Dome | May 30, 1950 |
| 2,537,610 | Volz | Jan. 9, 1951 |